Dec. 26, 1967 P. KOELLER ETAL 3,360,238
SHROUD SEAL FOR HYDRAULIC MACHINES
Filed Feb. 13, 1967
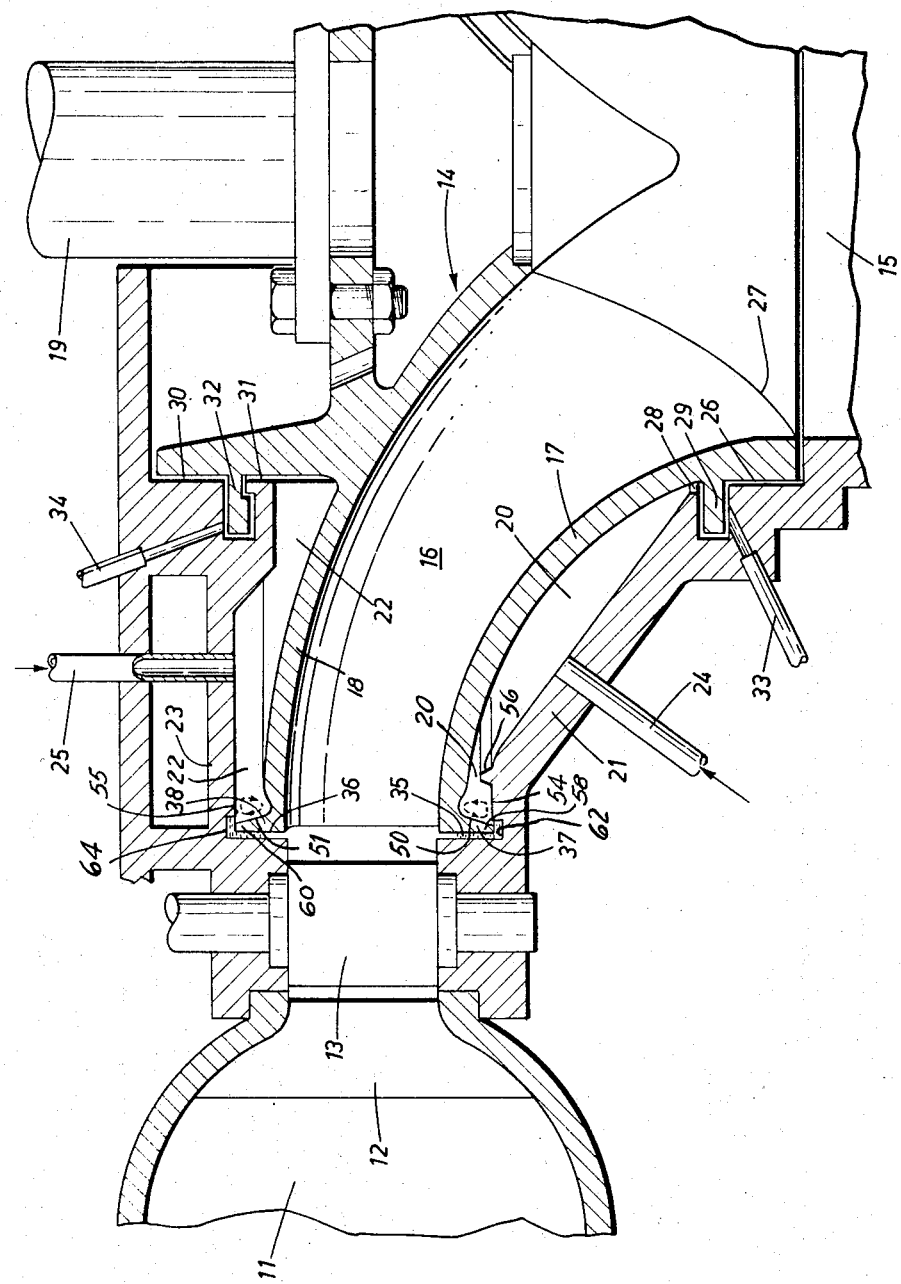
INVENTORS
PAUL KOELLER
JOHANN H. LANG

United States Patent Office 3,360,238
Patented Dec. 26, 1967

3,360,238
SHROUD SEAL FOR HYDRAULIC MACHINES
Paul Koeller, Dorval, Quebec, and Johann H. Lang, Beaconsfield, Quebec, Canada, assignors to Dominion Engineering Works, Limited, Quebec, Quebec, Canada, a corporation of Canada
Filed Feb. 13, 1967, Ser. No. 615,581
7 Claims. (Cl. 253—26)

ABSTRACT OF THE DISCLOSURE

In a hydraulic turbine or pump having a shrouded runner the aeration space, formed between a shroud and the housing of the machine, is sealed against air leakage past the high pressure edge of the shroud by an axial shroud lip having an inclined inner surface for energizing a toroid of seal water within the shroud space, the adjacent housing surface serving to contain the toroid. The toroid provides a stable air-water interface, and promotes centrifugal separation of air from the sealing water.

---

This invention is a continuation-in-part of application Ser. No. 529,359, filed Feb. 23, 1966, now abandoned, and relates to a shroud seal for rotary fluid machinery such as turbines, pumps, and pump-turbines of the type which incorporate a shrouded impeller or runner and in which means are provided for reducing fluid friction on the impeller or runner by displacing the working fluid, in the spaces between the outside surfaces of the impeller or runner shrouds and the adjacent static structure, with a second fluid having the physical properties of less density and less absolute viscosity than the corresponding properties of the working fluid.

This invention relates specifically to the provision of peripheral shroud seals having annular lips positioned on the runner shrouds adjacent the outer peripheries and extending parallel with the rotational axis of the runner and away from the runner blades. When the runner is rotated, and working fluid is passing through the runner, the hydraulic conditions established at the runner outer periphery seals, due to the centrifugal action of the annular lips, is such that leakage of the second fluid from the spaces is reduced to a minimum.

When this invention is applied to a hydraulic turbine the working fluid will be water and an economical choice for the second fluid will be air.

In the following specification the invention is described as being embodied in an aerated vertical Francis hydraulic turbine, but it will be readily understood that other rotary fluid machines of the above mentioned type used in conjunction with a pair of fluids possessing the above mentioned relative physical properties may usefully incorporate this invention.

Prior to the present invention work has been carried out in which means are provided for reducing fluid friction losses in a rotary hydraulic machine such as a Francis turbine by introducing air into annular peripheral spaces bounded by the runner shrouds and the adjacent stator structure, the air being maintained in the shroud spaces by space seals.

Subsequent improvement in efficiency has been obtained by reducing the quantity of air required for aeration, by reducing the leakage of air through the space seals, using centrifugal air-water separation.

Further improvements have been obtained by centrifugal separators added to the band and crown space seals to provide air-water separation at the seals to more effectively maintain the air in the shroud spaces.

In addition means have been provided for automatically regulating the quantity and pressure of sealing water supplied to the centrifugal separator seals which is necessary for effective operation of the space seal centrifugal separator combination.

In the aforementioned prior invention the effective functioning of the aeration systems requires a small, but continuous, supply of air to the shroud spaces, to replace air escaping through the runner peripheral clearances. Once stable operating conditions are established after machine start up, any excess air supplied to the shroud spaces passes out from the aerated spaces through the runner peripheral clearances.

The present invention provides in a rotary hydraulic machine having a bladed runner rotatably mounted within a stationary housing to provide internal flow paths for working fluid between an inlet and an outlet of the housing, the runner having at least one annular shroud secured to the blades thereof and defining with the adjacent portion of the surrounding housing an annular space external to the runner having aeration means connected thereto, the improvement comprising a seal at the radially outer end of the aerated annular space including shroud flange means extending generally axially from the shroud surface external to the working fluid flow path and positioned in cooperating relation with an adjacent annular portion of the housing within the annular space to provide sealant contact surfaces, the radially inner surface of the flange being inclined from the runner main axis to impart rotational and axial motion to liquid flowing there-against during machine operation to produce substantially vortical motion of the sealing liquid towards said adjacent contact surface whereby rotation of the runner produces vortical sealing flow of liquid over the adjacent fluid contact surfaces to substantially seal the end of the annular space against loss of the aeration fluid.

An embodiment of the invention is described in detail, reference being had to the following detailed specification and drawing, which shows a fragmentary sectional view of a low specific speed mixed flow turbine, or pump-turbine, embodying the features of this invention, together with detail enlargements of the shroud outer seal.

Referring to the drawing, during operation of this machine as a turbine, water under pressure passes from the inlet casing 11 and is then directed, by stay vanes 12 and the wicket gates 13, to the runner, shown generally at 14, and is discharged at a reduced pressure into the draft tube 15.

Runner 14 comprises runner blades 16 connected together by band shroud 17 and crown shroud 18 and with shaft 19 connected to crown shroud 18. Shaft 19 drives a motor/generator (not shown) when the machine operates as a turbine. When the machine operates as a pump the motor/generator drives shaft 19, causing runner 14 to rotate, and the flow of water through runner 14 is reversed, i.e., water enters the turbine through draft tube 15 and discharges through wicket gates 13.

Band shroud space 20 is formed between band shroud 17 and band stator 21, and crown shroud space 22 is formed between crown shroud 18 and crown stator 23.

Air under pressure is injected into band shroud space 20 and crown shroud space 22 through pipes 24 and 25, respectively, to displace the higher density liquid from the shroud space and provide the required reduction in drag on the outside surfaces of band and crown shrouds 17 and 18, respectively.

A band space seal 26 is formed between the outside diameter of the low pressure edge 27 of runner 14 and the inside diameter of the adjacent stator structure 21 and provides a close clearance annular seal. A further band space seal 28 is formed by the restricted annular space between the inner periphery of band stator 21 and the adjacent outside surface of band shroud 17. Band centrifugal separator 29 extends radially between band space seals 26 and 28 and rotates within and is bounded on three sides by, band stator 21.

A crown space seal 30 is formed between the outside diameter of the upper portion of runner 14 and the inside diameter of the adjacent stator structure 23, and at approximately the same radius from the axis of rotation as band space seal 26, and provides a close clearance annular seal. A further crown space seal 31 is formed by the restricted annular space between the inner periphery of crown stator 23 and the adjacent outside surface of crown shroud 18. Crown centrifugal separator 32 extends radially between crown space seals 30 and 31 and rotates within, and is bounded on three sides by, crown stator 23.

Seal water under pressure is supplied through line 33 to band space seal 26 and band centrifugal separator 29, from a controlled source (not shown).

Seal water under pressure is supplied through line 34 to crown space seal 30 and crown centrifugal separator 32, from the same, or similar, controlled source (not shown).

The operation of a turbine embodying the foregoing prior developed features permits stable turbine operation in which the spaces 20 and 22, between the outside surfaces of the runner shrouds and the adjacent static structure, are filled with air and with the space seal centrifugal separator combinations effectively preventing the inward leakage of said air into draft tube 15. A small but continuous supply of air is necessarily fed to the shroud spaces to make up lost air, which leaks outwardly through the runner outer peripheral clearances 35 and 36.

In accordance with the present invention a band annular lip 37 is positioned at the outer periphery of band shroud 17 and extends substantially axially in a direction generally parallel with the rotational axis of runner 14 and away from runner blades 16. Similarly, a crown annular lip 38 is positioned at the outer periphery of crown shroud 18 and extends oppositely, away from runner blades 16.

The radially inner surfaces 50, 51 of the band lip 37 and crown lip 38 respectively, extend axially away from band shroud 17 and crown shroud 18 and are inclined outwardly relative to the runner main axis. An angle of about 30° from the runner axis has been found to be satisfactory. The lip inner surfaces 50, 51 provides energizing surfaces, to inpart three dimensional toroidal motion to the seal water, illustrated two dimensionally in the detail enlargements. The surfaces 50, 51 are shown as being relieved at their juncture with the respective shrouds to provide radiused transition recesses. The seal water thus energized contacts the recirculation surface portions 54, 55 within the aeration spaces 20, 22 in sealing relation therewith. The recirculation surface portions 54, 55 serve to conform the flow of energized sealing water to a vortical flow path. The vortical rotary motion of the seal water within the aeration space tends to provide centrifugal separation of the air from the sealing liquid.

An annular barrier 56 in the form of a raised rib limits the leakage of seal water inwardly into the main aeration space 20. The reduced axial end portion 58, 60 of the lips 37, 38 are located in relation to grooves 62, 64 recessed in the respective housings 21, 23. These grooves provide working axial clearance to ensure that the relatively thin lip edges 58, 60 shall not be accidentally damaged against the respective housings during installation or adjustment of the machine. The axial clearances at the lip edges 58, 60 appreciably exceed those at the separators 29, 32, to ensure that the lip end surfaces do not contact the housing.

In the operation of a turbine embodying the aforementioned features and including annular lips 37 and 38, rotation of annular lips 37 and 38 produces centrifugal separation between the water and the air adjacent lips 37 and 38 and an energized rotating ring of water provides an air-water interface. These rotating rings of water act effectively as seals and restrict the amount of air which leaks therethrough.

It is generally understood that the radially inner annular surfaces of the shroud lips 37, 38 by their rotation serve to energize and direct water in the peripheral zone of the shroud, producing vortical flow across the inner shroud surface and then radially inwardly in an anticlockwise direction in the case of the lower shroud and clockwise in the case of the upper shroud in relation to the figure. The radial width of rotating water annulus thus produced by this vortical circulation is affected by the velocity of the annular energizing surface and by the internal pressure within the shroud space of the aerating gas. A compromise is generally desirable between a wide vortical seal ring having high gas sealing properties and relatively high friction drag against the energizing runner surface, and a narrow vortical seal ring having lower gas sealing properties and reduced friction drag against the runner while the upper seal lip 38 and the lower lip 37 both serve to generate vortical sealing flow across their wetted surfaces and the adjacent wetted surfaces of the annular shroud spaces within the stationary upper and lower portions of the housing respectively, it will be seen that in the case of the upper housing any water from the seal zone will tend to drip off the housing and back into circulation with the sealing liquid, while in the lower portion of the housing the provision of the raised annular lip or bead 56 reduces the likelihood of sealing liquid from flowing radially inwardly from the peripheral sealing zone to the quiescent portion of the lower shroud space.

The restricted outer radial clearances 35, 36 separating the lips 37, 38 from the adjacent housing portions minimize mass exchange of sealing liquid between the vortical seal flow and the main working liquid to minimize the transference of any entrapped air outwardly from the respective aeration spaces.

While the disclosed working liquid is water and the fluid within the shroud spaces is air, it is contemplated that the seal structure of the present invention may be utilized for other fluids.

What we claim as new and desire to secure by Letters Patent of the United States is:

1. In a rotary hydraulic machine having a bladed runner rotatably mounted within a stationary housing, said housing having wall portions forming a flow path for the main flow of working liquid therethrough; at least one annular shroud secured to the blades of the runner and defining with an adjacent portion of the housing an annular shroud space external to the runner, having aeration means connected thereto, the improvement comprising a seal at the radially outer portion of said aerated shroud space, having an annular narrow edged axial lip extending from said shroud, said lip inner surface bounding said aeration space and forming a seal water energizing surface therein, and a seal recirculation surface within said areation space adjacent the end of said lip extending inwardly towards the axis of the runner and providing in operation a liquid flow conforming surface to maintain vortical flow of sealing liquid from said lip inner surface under the influence of pressurized aeration fluid within said aeration space whereby a stable liquid-gas sealing interface is maintained in stable sealing relation with the aerated shroud space.

2. An aeration seal as claimed in claim 1, the radially outer annular surface of said lip extending axially in substantially parallel relation with the facing portion of said housing to define a close radial clearance extending from said flow path to said aeration seal, said lip tapering outwardly relative to the runner main axis whereby energization of said seal liquid is enhanced, and mass transfer from the seal to the main flow of working liquid is minimized.

3. An aeration seal as claimed in claim 2 including an annular recess in said housing in axial facing relation with the end of said seal lip remote from said shroud, to provide axial clearance for the lip an axial movement of the runner relative to the machine housing, the adjacent end surface of the lip being of reduced area.

4. An aeration seal as claimed in claim 1 wherein said shroud is the band shroud, said annular seal liquid contact surface having an annular barrier on a radially inner portion thereof extending axially towards said shroud, to limit the passage of excess seal liquid into said aeration space.

5. An aeration seal as claimed in claim 2 wherein said shroud is the band shroud, said annular seal liquid contact surface having an annular barrier on a radially inner portion thereof extending axially towards said shroud, to limit the passage of excess seal liquid into said aeration space.

6. An aeration seal as claimed in claim 3 wherein said shroud is the band shroud, said annular seal liquid contact surface having an annular barrier on a radially inner portion thereof extending axially towards said shroud, to limit the passage of excess seal liquid into said aeration space.

7. An aeration seal as claimed in claim 3, said liquid energizing surface including a radiused transition recess in the adjoining shroud surface.

References Cited

UNITED STATES PATENTS

| | | | |
|---|---|---|---|
| 2,818,227 | 12/1957 | Suss | 253—26 |
| 3,220,696 | 11/1965 | Chatfield et al. | 253—26 |
| 3,236,499 | 2/1966 | Chatfield et al. | 253—26 |

FOREIGN PATENTS

| | | |
|---|---|---|
| 279,903 | 7/1928 | Great Britain. |

EVERETTE A. POWELL, JR., *Primary Examiner.*